Aug. 13, 1935.  J. H. DEVINE  2,010,812
LUNCH BOX
Filed Feb. 4, 1932   3 Sheets-Sheet 1

Inventor:
James H. Devine
By Brown, Jackson, Boettcher & Skinner,
Attys.

Aug. 13, 1935.　　　J. H. DEVINE　　　2,010,812
LUNCH BOX
Filed Feb. 4, 1932　　　3 Sheets-Sheet 2

Inventor:
James H. Devine
By Brown, Jackson, Boettcher & Dienner
Attys.

Aug. 13, 1935.　　J. H. DEVINE　　2,010,812

LUNCH BOX

Filed Feb. 4, 1932　　3 Sheets-Sheet 3

Inventor,
James H. Devine
By Brown, Jackson, Boettcher & Dienner,
Attys.

Patented Aug. 13, 1935

2,010,812

UNITED STATES PATENT OFFICE 2,010,812

LUNCH BOX

James H. Devine, Ste. Genevieve, Mo., assignor to Dev-Insular Company, St. Louis, Mo., a corporation of Missouri Application February 4, 1932, Serial No. 590,977

5 Claims. (Cl. 220—17)

This invention relates to containers for comestibles and more particularly to lunch boxes that are thermally insulated in such manner as to retain comestibles in either a hot or cold condition.

Briefly, the type of device to which this invention pertains, comprises an outer casing, an inner casing thermally insulated from the outer casing, and a plurality of food containers which are held in spaced relation to the inner casing and thermally insulated therefrom.

Broadly stated, the chief object of the present invention is to provide a device of the character described having high thermal efficiency so that the conduction of heat from the plurality of food containers will be reduced to a minimum.

More specifically, it is one of the objects of the present invention to provide means for rigidly supporting and positioning the inner casing centrally of the outer casing and thermally insulating it therefrom.

It is another object of the invention to provide insulated point contact means for holding the food containers in spaced relation to the inner casing so that the point of contact therebetween will be reduced to a minimum, thus greatly reducing conduction between the containers and the inner casing.

A further object of the invention is to provide a device of the character described of improved construction which will be capable of withstanding the abuses to which it is necessarily subjected to in use and which may readily be produced at relatively small cost.

A still further object of the invention is the provision of a device of the character described that is highly sanitary and one in which the removable parts thereof can be readily assembled or disassembled.

Other objects and advantages of the invention will appear from the following detailed description when taken in connection with the accompanying drawings, in which.

Figures 1, 11, 12, 15:
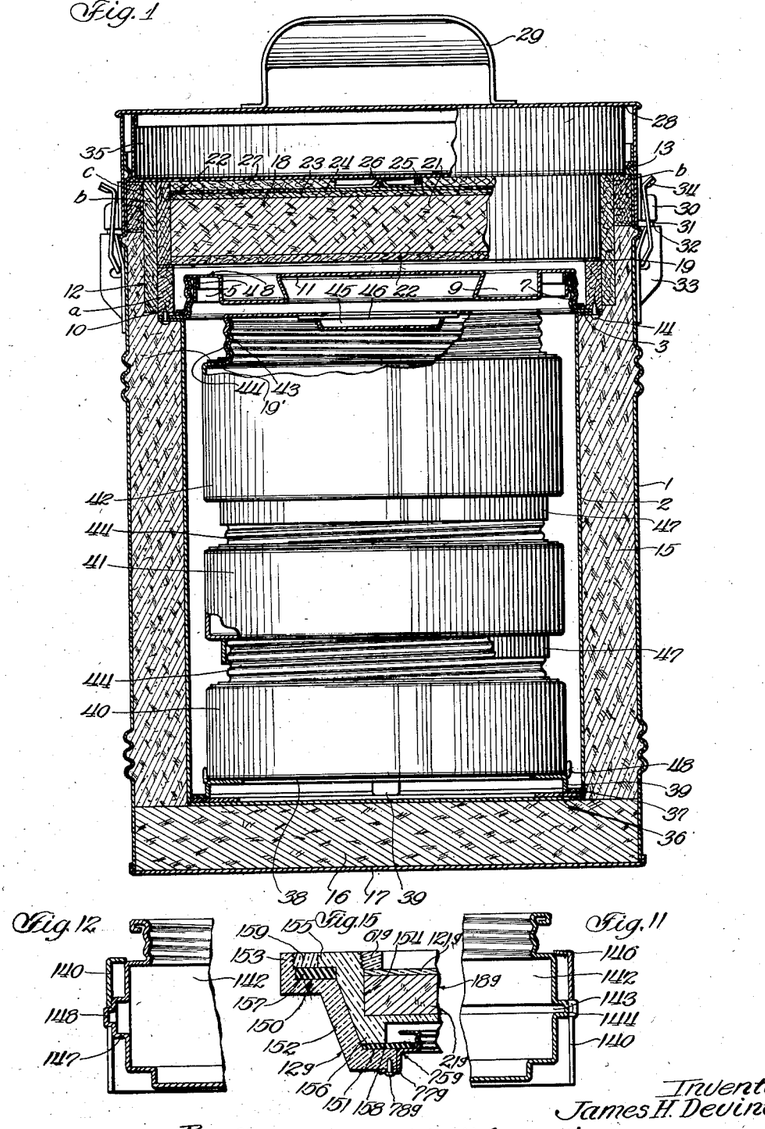
Figure 1 is a vertical sectional view through a lunch box constructed in accordance with my invention.
Figure 11 is a fragmentary sectional view of another means of insulating the food containers.
Figure 12 is a view similar to Fig. 11 of a modified manner of attaching the insulating means to the food containers.
Figure 15 is a fragmentary vertical sectional view of a modified form of the means for connecting the liner to the outer casing and the means for insulating the top of the liner from the top of the outer casing.

In constructing a lunch box, I provide an outer casing 1 of generally cylindrical shape, although it may be constructed in any desired form without departing from the spirit of the present invention. This casing may be formed of any suitable material, though I preferably use sheet aluminum. If desirable, this casing may have its outer surface given a suitable finish to simulate wood, in a known manner, or the casing may have its outer surface covered with leather or other suitable material, so as to present an attractive appearance.

Within the casing 1, I dispose a casing 2 in the form of a sheet metal liner. This casing or liner is provided with a flange 3, for a purpose which will hereinafter appear. This flange may be suitably pressed from the wall of the liner, or formed in any other suitable or preferred manner. The upper marginal edge of the liner is bent inwardly and then downwardly to form a flange 4 behind which is disposed a metal strip 5. This strip is soldered or secured to the flange 4 in any suitable or preferred manner and serves to strengthen the external threads 7 formed on that portion of the liner 2 between the flanges 3 and 4. The screw threads 7 engage internal threads formed on a closure member 8, which closes the upper end of the liner 2. This closure member is preferably formed of sheet metal and is provided with a depression 9 forming a portion 11, which may readily be grasped by the hand to facilitate unscrewing the closure member from the liner 2. A gasket 10 is preferably disposed between the flange 3 and closure member 8 to assure a steam tight fit of said member with said liner.

The liner 2 is disposed in the casing 1, centrally thereof, and firmly secured in place by means of a collar 12. This collar is preferably constructed of pressed paper, although any other suitable material of like nature may be employed, and is composed of three concentric rings or sections $a$, $b$, and $c$, which are glued or otherwise secured together in any suitable or preferred manner. The ring $c$ is disposed in abutting relation to the inner surface of the outer casing and the ring $b$ is secured to the inner surface of the ring $c$ with its upper surface flush with the upper surface of said ring. The ring $b$ extends downwardly into the casing an appreciable distance and the ring $a$ is secured thereto, with its lower surface extending a slight distance below the lower surface of the ring $b$. The collar 12 has a tight fit with the inner surface of the wall of outer casing 1 and is prevented from moving upwardly therein by reason of section $c$ of said collar abutting the under surface of a bead 13 which is pressed inwardly from the wall of casing 1. The flange 3 of the liner 2 abuts the under surface of sections $a$ of the collar and the liner is rigidly secured to said collar by means of pins 14 which pass through the flange 3 into section $a$ of the collar.

The space between the side wall of casing 1 and liner 2 is filled, preferably, with granulated cork 15 while the space between the bottom wall of casing 1 and liner 2 is preferably filled by a cork disc 16, or any other suitable heat insulating material.

A closure member, designated generally by the reference character 18, is associated with the collar 12 and serves to thermally insulate the top of liner 2 from the top of outer casing 1. This closure member seats upon the upper surface of section $a$ of said collar and has a snug fit with the side walls of section $b$ thereof. Preferably, a gasket 19 is interposed between section $a$ of collar 12 and member 18 to assure a steam-tight fit. The closure member comprises a body 21 of cork, or other material which is effective as a heat insulator, the bottom and sides of which have a covering of paper 22. The upper surface of the closure member also has a layer of paper 23 upon which is disposed a substantially rectangular plate 24. A handle 25, in the form of a bail, is pivotally secured to said plate at 26, to facilitate removing closure member 18 from the casing. A second covering of paper 27 is secured to the paper covering 23 and overlaps plate 24 a sufficient distance to secure said plate to the closure member. The coverings 22 and 23 are relatively thick, as is the covering 27, and may be secured to the body 21 of the closure member by an adhesive or in any other suitable or preferred manner.

From the foregoing, it will readily be apparent that the liner 2 is thus thermally insulated from the outer casing 1 so as to prevent loss of heat from the liner to the casing by conduction.

In assembling the lunch box, the liner 2 is first preferably secured to the collar 12, in the manner hereinbefore described, and the collar and liner are then slipped upwardly into the casing 1 through the bottom thereof until section $c$ of said collar abuts the bead 13 of the casing. The space defined by the side wall of the liner and casing is then filled with granulated cork, after which the cork disc 16 is put into place. The bottom 17 of casing 1 is then secured to said casing by soldering, or in any other suitable or preferred manner.

The open end of outer casing 1 is closed by a cover 28 to which is suitably secured a handle 29. Cover 28 is provided with bosses 30, having depending tongues 31, secured to said cover in any suitable or preferred manner. The tongues 31 engage in recesses 32 formed in fastening devices 33, which are secured to the outer casing 1 in any suitable or preferred manner. The fasteners 33 are of known type, being ordinary trunk fasteners having a bail 34 pivotally secured thereto for engaging over the bosses 30 and exerting downward pressure thereon when said bosses are in operative position. Any other suitable or preferred fastening means may, however, be employed. Bosses 30 and fastening devices 33 serve to secure the cover on the outer casing and also to assure tight closure of said cover by downward pressure. The cover 28 is of sufficient height to enclose a tray 35, which fits within the outer casing and seats upon the upper surface of sections $b$ and $c$ of collar 12 and upon the closure member 18. This tray, which is shallow, is preferably constructed of sheet aluminum, and is adapted to contain bread, pies, cakes, or similar food stuffs. The downward pressure of the cover on the tray 35 also serves to keep the closure member 18 firmly pressed against the gasket 19 to assure a steam tight fit.

Disposed within the liner 2 are two gaskets or rings 36 and 37, the ring 36 lying upon the bottom wall of said liner and the ring 37 being superposed upon the ring 36. Both of the rings have a snug fit with the side wall of liner 2 and are preferably formed of rubber or other suitable heat insulating material. A ring or plate 38, preferably formed of sheet metal, is disposed upon the ring 36. This plate 38 is provided with lugs 39, which may be suitably punched therefrom, or formed in any other suitable manner. These lugs form feet or legs which seat upon the ring 36 thereby supporting the body portion of said plate out of contact with the bottom wall of liner 2. It will be noted that the ring 37 has a larger internal diameter than the ring 36 and that the legs 39 of plate 38 contact the inner wall of the ring 37. As the ring 37 has a snug fit with the wall of liner 2 the plate 38 is, therefore, prevented from moving sidewise into engagement with the side wall of liner 2. From the foregoing, it will be apparent that the rings 36 and 37 completely insulate the plate 38 from the liner 2. Also, as the plate 38 is adapted to support a plurality of containers or tanks 40, 41 and 42 disposed one upon the other, respectively, in a manner which will hereinafter more fully appear, these tanks will also be completely insulated from the wall of the liner 2 in such manner as to prevent conduction between the tanks and the liner.

The tanks 40, 41, and 42, may be constructed of any suitable material, depending largely upon the characteristics of the substance to be placed in the tanks. Under ordinary conditions these tanks may be constructed of sheet aluminum. Each of the tanks is provided with an exteriorly threaded neck 43 adapted to receive an interiorly threaded closure member 44, which is adapted to have a steam tight fit with the tanks. A gasket 19' is also preferably employed to further assure a steam tight fit between the closure member and the tank. The closure member 44 is preferably provided with a depression 45, in which is disposed a strap 46, secured to the closure member in any suitable or preferred manner, this strap forming a handle to facilitate removal of the tank from the liner. The tanks 41 and 42 are each provided with a depending flange neck 47 secured to the bottom wall of the tank as by soldering, or in any other suitable manner. This flange is adapted to have a friction fit with the neck of the closure member of the tank upon which it is mounted. That is, the flange of the tank 42 has a friction fit with the neck of the closure member of tank 41, upon which it is mounted, and the flange of tank 41 has a friction fit with the neck of the closure member of tank 40, upon which it is mounted. The lower tank 40 is not provided with this flange but seats directly upon the ring or plate 38 and is prevented from moving thereoff by means of lugs 48, suitably formed on the plate 38. While I have shown three tanks for containing the articles of food, obviously, the number of tanks can be varied as desired.

Figure 2:
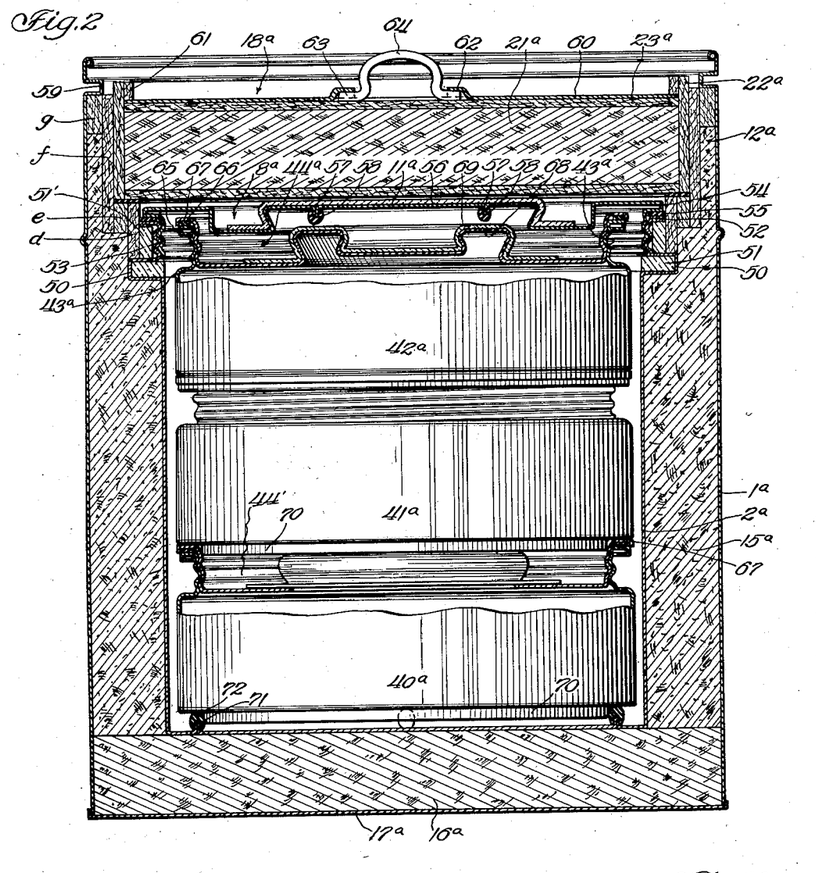
Figure 2 is a vertical sectional view through a slightly modified form of lunch box embodying the principles of the present invention.

The modified form of the device illustrated in Figure 2 is similar to that illustrated in Figure 1 in that it comprises a liner 2a disposed within an outer casing 1a, substantially centrally thereof, and thermally insulated from said casing. The liner 2a is provided with a channel 50 pressed outwardly from the wall thereof for a purpose which will hereinafter appear. A ring of suitable insulating material 51 is preferably disposed in the channel 50. The upper marginal edge of the liner 2a is bent outwardly and then bent back upon itself to form a flange 52. The portion of the liner 2a between the channel 50 and flange 52 forms a neck 53 which is interiorly threaded to engage external threads formed upon a closure member 8a, which closes the upper end of the liner 2a. A ring of suitable heat insulating material 51' is disposed around the outside of neck 53 of liner 2a, and between the flanges 50 and 52 thereof. This ring 51' also contacts the inner wall of section d of collar 12a and serves to prevent side motion of the liner 2a. It will be noted that closure member 8a, as well as all of the closure members hereinafter referred to are adapted to screw into their respective receptacles. I preferably employ such a construction as the receptacles expand when heated and it is then difficult to employ a closure member which screws over the receptacle. The closure member 8a is provided with an outwardly extending flange 54, between which and the flange 52 is clamped a gasket 55 for assuring a steam-tight fit between the closure member and the liner. The upper surface of portion 11a of the closure member is provided with a cover of heat insulating material 56 which may be secured therto in any suitable manner. A plurality of lugs, or teats 57 are pressed in the portion 11a of member 8a and extending downwardly from the under surface thereof for a purpose which will hereinafter appear. A covering of heat insulating material 58 is secured to each of the teats in any suitable or preferred manner.

The liner 2a is secured in the casing 1a by means of a collar 12a. This collar is of substantially the same construction as the collar 12 illustrated in Figure 1, except that it is composed of four sections d, e, f, and g, suitably secured together. Sections e, f, and g of collar 12a are secured together in the same manner as sections a, b, and c of collar 12 (Figure 1). Section d of the collar is secured to section e thereof and with its upper surface flush with the upper surface of said section. This section, it will be noted, extends downwardly into the outer casing a short distance below section e of the collar. The collar has a tight fit with the inner surface of the wall of outer casing 1a and is prevented from moving upwardly therein by means of a channel 59, which is pressed inwardly from the wall of casing 1a and which extends over the upper surface of section g of said collar. The channel 50 of liner 2a abuts the under surface of section d of the collar, this liner being held against said collar by the cork disk 16a and the bottom wall 17a of outer casing 1a.

The liner 2a is thermally insulated from outer casing 1a by the granulated cork 15a, cork disc 16a, collar 12a and closure member 18a as in the device of Figure 1. It is to be understood that any other suitable heat insulating material other than the granulated cork or the cork disc may be used if desired. The outer casing and the liner are assembled in substantially the same manner as has been described in connection with the device of Figure 1.

The closure member 18a for thermally insulating the top of the liner from the top of the outer casing is of substantially the same construction as the closure member 18 illustrated in Figure 1. However, instead of the plate 24 of Figure 1, I provide a metal disc 60 which is disposed upon and covers substantially the entire area of the upper surface of pressed paper disc 23a, which is secured to the body of cork 21a of the closure member. A ring 61 of pressed paper or other suitable material engages over the upper surface of this disc adjacent the periphery thereof for securing the disc to the closure member. This ring is suitably secured to the inner surface of the paper covering 22a, which in this case extends above the body of cork 21a and terminates flush with the ring 61, surrounding the side wall of the cork. The disk 60 adjacent its axis is provided with a raised portion forming flanges 62 these flanges engaging over the ends 63 of a handle 64 for securing said handle to the closure member.

The tanks 40a, 41a, and 42a are of the same general shape as the tanks illustrated in Figure 1 but are provided with an interiorly threaded neck 43a having an outwardly extending flange 65 formed thereon as by bending the outer edge of the neck outwardly and then back upon itself. A closure member 44a having external threads for cooperating with the internal threads of the neck 43a serves to close the tanks. A gasket 66 is preferably clamped between the flange 65 and a flange 67, formed on the outer edges of the closure member 44a, to assure a steam-tight joint. The closure member is provided with a raised portion 68 forming a handle for facilitating removal of the member from the tank or for placing it therein. Since there is not sufficient clearance between the tanks and the liner for grasping the exterior circumference of the closure members the raised portion 68 thus furnishes an advantageous means for removing the tanks from or placing them in the liner. This is likewise true of the raised portions 11 and 11a of closure members 8 and 8a, respectively. This raised portion is preferably provided with a suitable covering of heat insulating material 69 to protect the hand from the heat of the container when the closure member is removed. This raised portion of the closure member is also adapted to contact the teats 57 should the tanks become disarranged. These teats in such case would provide insulated point contact means between the closure member 8a and the closure member 44a, thereby reducing conduction of heat between said members to a minimum. The teats 57, however, under normal conditions do not have any contact with the closure member 44a. The tanks are disposed one on top of the other and seat upon the flange 67 of the preceding tank. That is, the bottom wall of tank 41a seats upon the flange 67 of tank 40a and the bottom wall of tank 42a seats upon the flange 67 of tank 41a. Each of the tanks are provided with a depending flange 70, said flange in the case of the tanks 41a and 42a extending downwardly into a depression 44' in the closure member 44a and contacting the side wall thereof. This prevents the tanks from sliding off of each other. Teats 71 serve to support the tanks in the liner 2a. These teats are pressed upwardly from the bottom wall of liner 2a and are provided with suitable heat insulating material 72, secured to said teats in any suitable or preferred manner. Flange 70 of tank 40a contacts the insulating material 72 on teats 71 and serves to prevent the tank from sliding off of said teats. The teats thus serve to hold the tank 40a in spaced relation to the bottom and side wall of liner 2a and to form in effect insulated point contact means between said liner and the tanks thereby reducing conduction of heat to a minimum.

Figures 3, 6, 8, 13, 14:
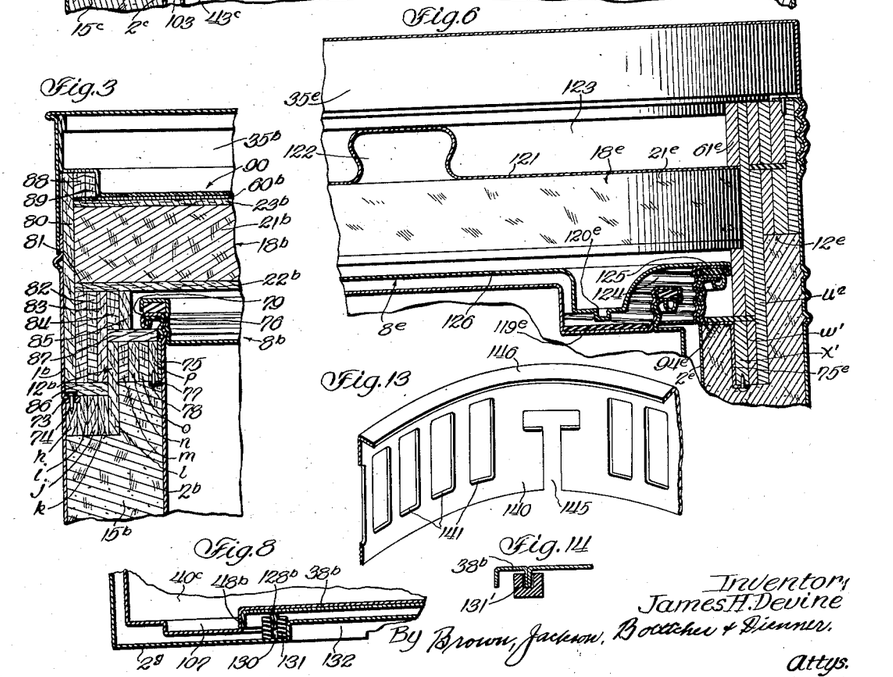
Figure 3 is a vertical sectional view through the upper portion of another modified form of lunch box.
Figure 6 is a vertical sectional view through the upper portion of a fifth modified form of lunch box.
Figure 8 is a view similar to Figure 7 of another modified form of insulated contact means between the food containers and the inner casing.
Figure 13 is an isometric sectional view of the insulating means shown in Figures 11 and 12.
Figure 14 is a vertical sectional view of a modified form of insulation block shown in Figure 8.

In the modified form of the device illustrated in Figure 3, I provide an outer casing 1b within which is disposed, substantially centrally thereof, a liner 2b, this liner being thermally insulated from the casing by a surrounding layer of granulated cork 15b. A collar 12b, of substantially Z-shape, is disposed within the casing and has a tight fit with the walls thereof. This collar is composed of a plurality of rings or sections, designated by the letters h to p, inclusive, formed of pressed paper or other suitable heat insulating material, these sections being glued or otherwise secured together in any suitable or preferred manner. Section l is of greater height than sections h to k and sections m to p, inclusive. Sections h to k, inclusive, are secured to the outer surface of section l, adjacent the lower edge thereof, and the lower surface of these sections terminate substantially flush with the lower surface of section l. Sections m to p, inclusive, are secured to the inner surface of section l and the upper surface of these sections terminate flush with the upper surface of section l. Section h of said collar is of slightly less height than sections i, j, and k and the upper surface thereof abuts the under surface of a flange 73, which is pressed inwardly from the side wall of casing 1b in any suitable or preferred manner. Suitable brads 74 extend through the flange 73 into section h of said collar and serve to rigidly secure the collar to said flange.

A ring 75, preferably formed of aluminum serves to rigidly secure the liner 2b to the casing 1b. This ring is disposed within the collar 12b in abutting relation with the inner surface of section p thereof, with which it has a relatively snug fit. Adjacent its upper and lower edges the ring is provided with outwardly extending flanges 76 and 77, respectively, the flange 77 extending under and abutting the under surface of section p of said collar. Suitable brads or screws 78 extend through the flange 77 into section p of the collar and serve to rigidly secure said ring to said collar. It will be noted that the ring 75 extends an appreciable distance above the collar 12b, and that such portion of the ring between the upper surface of the collar and the flange 76 is internally threaded. These internal threads are adapted to have threaded engagement with external threads formed on the liner 2b, adjacent the upper end thereof, and to thus securely position said liner within said casing. It may be well to point out here that the liner 2b is provided with an outwardly extending flange 79 which, when the liner is in position within the casing, seats upon the flange 76 of the ring 75. The outer end of the flange 79 is bent downwardly over the outer periphery of flange 76 and then bent back upon itself so that the outer periphery of such bent back portion contacts the under surface of the flange 76. Such a construction prevents movement of the external threads of the liner inwardly away from the interior threads formed on the ring 75, as well as to prevent the liner from being turned out of the ring 75 when the closure member therefor is removed. This construction also keeps the gasket 87 securely in place when the hereinafter described closure member 18b is removed.

The construction of the closure member 8b is substantially the same as the construction of the closure member 8a, illustrated in Figure 2, and need not therefore be further described here.

The closure member 18b for thermally insulating the top of the liner from the top of the casing is similar in construction to the closure member 18a, illustrated in Figure 2, in that it also comprises a body 21b, of cork or other suitable heat insulating material, having a covering of pressed paper discs 23b and 22b suitably secured to the upper and lower surfaces thereof, respectively. However, as the liner 2b in the instant case extends above the upper surface of the collar 12b, the side walls of the cork body 21b have been provided with a pressed paper ring 80, secured thereto in any suitable or preferred manner. This ring extends an appreciable distance below the surface of the body of cork 21b and is adapted to seat upon section h of collar 12b for spacing the closure member 18b out of contact with the closure member 8b. Also, a plurality of concentric rings, designated as 81 to 85, inclusive, are suitably secured to the under surface of the paper disc 22b and to the inner surface of the ring 80. The rings 84 and 85 are of less height than the rings 80 to 83, inclusive, and are adapted to seat upon sections l and m of collar 12b, while the rings 81, 82 and 83 are adapted to seat upon sections i, j, and k of said collar. A gasket 86 is preferably disposed between rings 80 to 83, inclusive, and sections h to k, inclusive, of the collar 12b, and a gasket 87 is disposed between rings 84, 85 and sections l, m of said collar to assure a steam tight fit of said closure member with said collar. The ring 80 it will be noted also extends a short distance above the upper surface of the paper disc 23b. Concentric rings 88 and 89, secured together and to the inner surface of ring 80, engage over the upper surface of a metal disc 60b for securing the disc to the closure member. This disc is of substantially the same construction and for the same purpose as the disc 60, illustrated in Figure 2, and need not therefore be further described here. The tray 35b in the present construction is provided with a depression 90 and seats upon the rings 80, 88 and 89 and the metal disc 60b.

Figure 4:
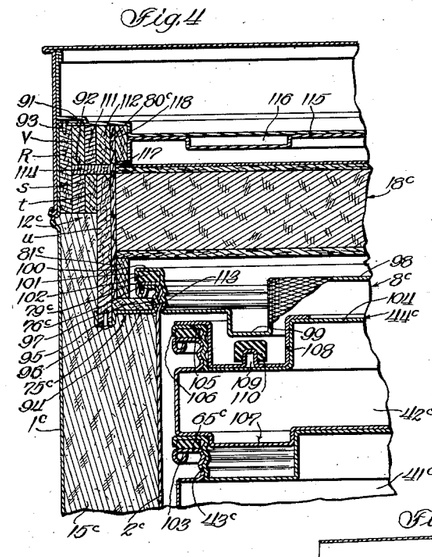
Figure 4 is a vertical sectional view through the upper portion of a third modified form of lunch box.

In the modified form of the device illustrated in Figure 4, I have provided a substantially cylindrical outer casing 1c and an inner casing 2c disposed within the outer casing and thermally insulated therefrom by a surrounding layer of granulated cork 15c. The outer casing 1c is provided with an inwardly turned marginal flange 91 for a purpose that will hereinafter appear.

A collar 12c and ring 75c serve to rigidly secure and position the liner 2c within the casing 1c, in much the same manner as has heretofore been described in connection with the device of Figure 3. The collar 12c is preferably constructed of pressed paper, or other suitable heat insulating material, and comprises a plurality of concentric rings, designated as r to v, inclusive, secured together in any suitable or preferred manner. The rings s and t, it will be noted, are less than half the height of the ring r and are so disposed with respect to the ring r that their lower surface terminates flush with the lower surface of the ring r, while the ring u, which is secured to the inner surface of the ring t, extends downwardly an appreciable distance below the rings s and t and has its upper surface disposed flush with the upper surface of said rings. The ring v, which is of substantially the same height as the rings s and t, is secured to the inner surface of the ring r and with its upper surface flush with the upper surface of said ring. The rings s and v, both of which are secured to the ring r and both of which are of less than half the height of such ring, form a space 92 therebetween for a purpose that will hereinafter appear. The collar 12c has a relatively snug fit with the inner surface of the outer casing and is disposed in said casing with the upper surface of the rings r and v abutting the under surface of the flange 91. Suitable brads 93 passing through the flange 91 into section r of said collar serve to rigidly secure the collar to the casing 1c.

The ring 75c is preferably formed of aluminum and serves to secure the liner 2c to the collar 12c. This ring comprises an outwardly extending portion 94, disposed at substantially right angles to the liner 2c, having a depressed channel portion 95 formed on the outer end thereof. The lower end of section u of collar 12c is adapted to seat in this channel portion and the ring 75c is secured to the collar 12c by means of brads 96 which extend through said channel portion into section u of said collar. The inner end of portion 94 of the ring 75c is provided with an upwardly extending portion 97, this upwardly extending portion being internally threaded. These internal threads are adapted to engage external threads formed on the liner 2c, adjacent the upper end thereof and to secure said liner to said ring. As in the case of the device illustrated in Figure 3, the upwardly extending portion 97 of the ring 75c is provided with an outwardly extending flange 76c and the liner 2c is provided with an outwardly extending flange 79c. The flange 79c seats upon the flange 76c and has its outer edge bent downwardly over the outer periphery of the flange 76c and then bent back upon itself so that the outer periphery of such bent back portion contacts the under surface of the flange 76c. From the foregoing it will be apparent that the liner 2c is rigidly secured to the outer casing 1c through the medium of the collar 12c and the ring 75c.

The closure member 8c for closing the open upper end of the liner 2c is of the type adapted to screw into the liner and is provided with external threads adapted to cooperate with the threads formed on the liner, adjacent the upper portion thereof. This member is cup-shaped and is provided substantially centrally thereof, with a raised portion 98, which is suitably knurled. This raised knurled portion 98 furnishes a convenient means for screwing or unscrewing the closure member into or out of the liner, respectively. The closure member is also provided with a plurality of depressed elements 99, adjacent the raised knurled portion 98, for a purpose that will hereinafter appear. If desired, an annular depression entirely surrounding the raised portion 98 may be employed instead of a plurality of depressed elements. An outwardly extending flange 100 having a downwardly turned lip or flange 101 is also formed on the outer edge of the closure member. Also, a suitable gasket 102 is interposed between the flanges 100 and 79c to assure a steam tight fit of the closure member with the liner.

The food tanks 42c and 41c, are each provided with an interiorly threaded neck 43c having an outwardly extending flange 65c, this flange having a bead 103 formed on the outer edge thereof. A closure member 44c, having external threads formed thereon for cooperating with the internal threads 43c of the tanks, serves to close said tanks. This closure member is cup-shaped and is similar in construction to the closure member 8c, which closes the open end of the liner 2c, in that it is provided with a raised knurled portion 104 and an outwardly extending flange 105, this flange 105 having a down turned flange 106 formed on the outer edge thereof. It may be well to state here that the downwardly extending flange on all of the closure members is advantageous in that it prevents the gaskets from creeping when compressed between the closure member and the tank or liner. The closure member 44c however, is not provided with the annular depression 99, as is the closure member 8c.

The tanks 42c and 41c are each provided with an annular depression 107 which may be pressed from the bottom wall thereof in any suitable or preferred manner. These tanks are arranged in the liner 2c, one on top of the other, and seat upon the flange 105 and the raised knurled portion 104 of the preceding tank. The annular depressed portion 107 of the tank extends downwardly into the cup-shaped portion of the preceding tank and abuts the inner surface of the neck 43c and the outer surface of the raised knurled portion 104 of said tank. Such a construction prevents the tanks from sliding off of each other.

The closure member of the upper tank 42c has a metal plate 108 preferably formed of aluminum, disposed thereon. This plate conforms to the contour of the upper surface of the closure member upon which it seats and is provided with a plurality of teats 109 projecting upwardly therefrom. These teats are preferably provided with a covering of insulation 110 and are adapted to contact the depressed portion 99 of the closure member 8c should the tanks within the liner 2c become disarranged. The teats in such case would provide insulated point contact means between the closure members 8c and 44c, thereby reducing conduction of heat between said members to a minimum. The teats however, under normal conditions do not have any contact with the closure member 8c.

The construction of the closure member 18c for thermally insulating the top of the liner from the top of the outer casing differs from the construction of the closure member 18b, of the device of Figure 3, in that the ring 80c has only one ring 81c secured thereto, instead of the plurality of rings 80 to 85 as in the device of Figure 3. Also, two concentric rings 111 and 112, of pressed paper or other suitable heat insulating material, are secured to the outer surface of the ring 80c adjacent the upper end thereof. A suitable gasket 113 is interposed between the outwardly extending portion 94 of the ring 75c and sections 80c—81c of the collar 12c. Also, a gasket 114, extending into the space 92 between section $v$ and section $s$ of the collar 12c, is interposed between sections $t$—$u$, of the collar, and the rings 111—112, of the closure member 18c. These gaskets assure a steam tight fit between the closure member 18c and the collar 12c. The gasket 114 has a relatively tight fit in the space 92 and is thus prevented from being disarranged when the closure member is removed. Attention is also here directed to the fact that the design of the closure member is such that the flow of heat upwardly in the box is by a broken path and that such flow of heat is obstructed by two soft rubber gaskets. I find that such a construction greatly increases the efficiency of my lunch box and greatly reduces the amount of heat which is gradually lost by radiation.

The closure member 18c is also provided with a cup-shaped metal plate 115, preferably of aluminum, this plate being provided with a plurality of finger holes 116 to facilitate the removal of the closure member. The plate is provided with an outwardly extending flange 117 formed on the outer edge thereof. An annular ring 118, suitably secured to the ring 80c, seats upon this flange and serves to secure the plate to the closure member.

Figure 5:
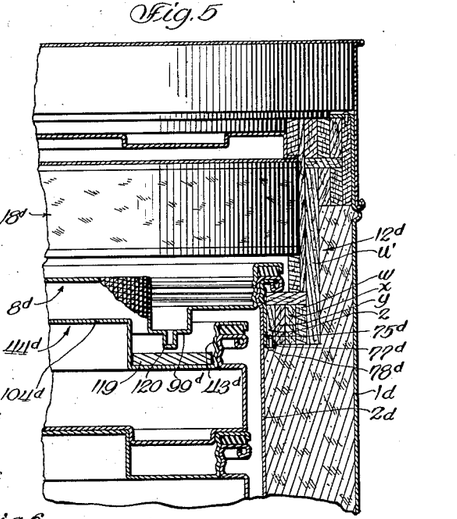
Figure 5 is a vertical sectional view through the upper portion of a fourth modified form of lunch box.

In the modified form of device shown in Figure 5, I have employed the ring 75, shown in Figure 3, in conjunction with the collar 12c of the device of Figure 4. The collar, designated as 12d in the instant device is of substantially the same construction as the collar 12c. However, as the ring 75 does not have the outwardly extending portion 94, as does the ring 75c of the device of Figure 4, I have provided the collar 12d with a plurality of concentric rings $w$, $x$, $y$, and $z$, so that the ring 75d of the instant device, may be connected thereto. These rings $w$, $x$, $y$, and $z$, may be secured to the inner surface of section $u'$ of said collar by any suitable means. The ring 75d is secured to the collar 12d by means of brads 78d which extend through the flange 77d into section $z$ of the collar. The liner 2d is connected to the ring 75d in the same manner as has been described in connection with the device of Figure 3.

Instead of providing the closure member 44d, of the instant device, with the metal plate 103, shown in Figure 4, I have disposed a gasket or ring 119 of suitable heat insulating material upon said closure member. This gasket seats upon the upper surface of the closure member, between the neck 43d and the raised portion 104d thereof, and directly below teats 120, which are pressed downwardly from the depressed elements 99d of the closure member 8d. The gasket and teats are normally out of contact with each other but serve to provide insulated point contact means between closure member 8d and closure member 44d should the tanks become disarranged in the liner 2d.

The construction of the closure member 18d is substantially the same as the construction of the closure member 18c and will not, therefore, be further described here.

In Figure 6, the collar 12e has been provided with two concentric rings $w'$ and $x'$, suitably secured to the inner surface of the ring $U^2$ of said collar, and the ring 75e has been provided with an outwardly extending portion 94e. The ring 75e is connected to the collar 12e and the liner 2e in the manner hereinbefore described.

It will be noted that in the closure member 18e the pressed paper discs 23 and 27, of Figure 1, have been eliminated and that a metal plate 121 seats directly upon the body of cork 21e. This plate is provided with a handle 122, pressed upwardly from said plate in any suitable or preferred manner, and is secured to the cork disc 21e by a ring 61e, similar to the ring 61 shown in Figure 2. This ring seats upon the outer edge of the plate and is suitably secured to the ring 80e by any suitable means. The various sections of the collar 12e have been lengthened so as to dispose the upper surface of the handle 122 below the top of the outer casing 1e. The space 123 between the plate 121 and the tray 35e, which seats upon the collar 12e and the handle 122, may be utilized for knives and forks or articles of similar nature.

The closure member 8e for closing the top of the inner liner is of two-part construction. This closure member comprises a threaded collar 124 having an outwardly extending flange 125. A plate 126, of the same general contour as the closure member 8d of Figure 5, seats upon the flange 125. This plate is secured to the collar 124 by bending the outer edge of the plate downwardly at right angles and then back upon itself. The outer edge of the flange 125 is also bent downwardly at right angles and fits into the bent back portion of the plate 126. The outer edge of the flange and the plate may be secured together as by spot welding or in any other suitable or preferred manner. This downwardly extending portion of the flange and plate also serve as a means to prevent gasket creeping.

Figure 7:
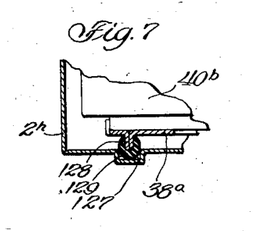
Figure 7 is a fragmentary sectional view of a modified form of insulated point contact means between the food containers and the inner casing.

Figure 7 illustrates a modified manner of providing insulated point contact means between the food tanks and the liner. In this form, I provide the liner 2h with depressions 127 which may be pressed from the bottom wall thereof, or formed in any other suitable or preferred manner. A ring or plate 38a disposed in the liner 2h supports the food tanks in the manner illustrated in Figure 1, the lower one of these tanks, illustrated in Figure 4, being designated by the reference character 40b. The plate is similar to the plate 38 except that it is provided with teats 128 instead of lugs 39. These teats are pressed or otherwise suitably formed on the ring 38a and extend downwardly from the under surface thereof. Suitable heat insulating material 129 is secured to the teats in any suitable or preferred manner. This insulating material is adapted to seat in the depressions 127 in liner 2h when the plate 38a is in place in said liner. The teats and insulating material serve to support the plate 38a, and consequently the food tanks, out of contact with the bottom wall of the liner. Also, as the insulation contacts the walls of the depressions in which they seat, they thus prevent sidewise movement of said plate. The plate and tanks are thus also held out of contact with the side wall of the liner. It will be noted that the area of contact of the insulation with the depression 127 is relatively small and provides in effect insulated point contact between the tanks and the liner.

Figure 8 shows the manner of insulating the food containers 42c, etc., illustrated in Figures 4 and 5, from the inner liner. As the tanks in this instance have been provided with a depression 107, the ring or plate 38b has been provided with a plurality of downwardly turned flanges 48b, instead of the upturned flanges 48, as shown in Figure 1. The plate is also provided with a plurality of teats 128b, these teats seating in a bore 130 in a block of suitable heat insulating material 131. These blocks are adapted to abut an upwardly projecting portion 132 pressed upwardly from the bottom wall of the liner 2g. The downwardly turned lugs 48b abutting the inner surface of the depression 107 of the tank prevent the tank from moving off of the plate 38b, and the insulating blocks 131 abutting the pressed-up portion 132 of the inner liner prevent movement of the plate toward or from the liner, so that the food tanks are effectively held out of contact with the liner. If desired, the block of insulation 131' shown in Figure 14, which is in the shape of a cup, may be employed instead of the block 131, in which the bore 130 extends entirely therethrough.

Figure 9:
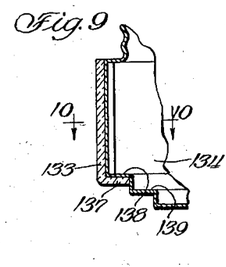
Figure 9 is a fragmentary sectional view of one of the food containers provided with a covering of heat insulating material.
Figure 10:
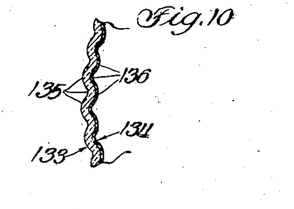
Figure 10 is a sectional view taken substantially along the line 10—10 of Figure 9.

In Figures 9 and 10 I have illustrated a cover 133 applied to the food tanks 134 whereby said tanks may be handled conveniently when hot. This cover may be formed of any suitable heat insulating material and is in the form of a cylinder, open at both ends, into which the tank may be slipped. The cover has a tight fit with the wall of the tank and is provided with a series of corrugations 135 which cooperate with a series of corrugations 136 formed on the tank. These corrugations are formed vertically on the side wall of the cover and tank and may extend completely around said cover or tank or over only a certain specific area, whichever is preferable. These corrugations serve to prevent the cover from slipping off of the tank, as well as to prevent the tank from turning in said cover when the closure member of the tank is being removed or replaced. The cover is also provided with an inturned flange 137, formed on the lower edge thereof. The tank with which this cover is used is provided with two depressed portions forming shoulders 138 and 139. The flange 137 of the cover fits snugly against the shoulder 138 and also serves to retain the cover on the tank. The shoulder 139 is adapted to seat upon the flange of the closure member of the preceding tank, as for example, the flange 67 of the closure member of tank 40a, shown in Figure 2.

Figures 11 and 13 illustrate another method of insulating the food tanks. In this case, the insulation comprises a ring 140, preferably formed of sheet metal, and provided with a plurality of openings or slots 141. Such a ring forms, in effect, a foraminous element that quickly dissipates the heat from the food tanks. The ring encircles the side wall of the tank 142 and is of sufficient height to extend for a short distance below the bottom wall of the tank, so that the tank may be set, for example, upon a table without the hot bottom wall of said tank coming into contact with the table and injuring it. The tank 142 is provided with a channel 143 pressed outwardly from the side wall thereof, this channel completely encircling the tank. A boss 144, secured to the channel in any suitable or preferred manner, is adapted to engage in a T slot 145 formed in the ring 140 for securing the ring to the tank in a manner well known in the art. The channel 143 serves to space the ring 140 from the tank and a rearwardly extending flange 146, formed on the ring 140, abuts the side wall of the tank and serves to prevent particles of food from becoming lodged in the space between the ring and the tank.

In Figure 12 I have shown a modified manner of securing the ring 140 to the tank 142. In this form, a plurality of bosses 147, preferably three in number, are pressed outwardly from the wall of the tank 142. A smaller boss 148 is also pressed outwardly from the bosses 147 and these bosses (148) engage in the T slot in the ring 140 to secure the ring to the tank. I find that this form of the device is less expensive, as the bosses may be pressed into the wall of the tank in a single operation.

In Figure 15 I have shown a collar 12g and closure member 18g preferably formed of phenolic plastic material. This material is fairly light in weight, has good insulating qualities and is highly sanitary. Moreover, the material is easily molded into any form and minute threading thereof is possible.

The collar 12g comprises two horizontal supporting surfaces 150 and 151 having a frusto-conical section 152 therebetween. The supporting surface 150 is also provided with an upwardly extending flange 153.

The inner liner (not shown) is secured to the collar by means of a metallic ring 75g. This ring is similar in shape to the ring 75e and is provided with an outwardly extending flange 77g. The ring is disposed in abutting relation with the collar 12g, as shown, and suitable brads or screws 78g, extending through the flange 77g into the supporting section 151 of the collar, serve to secure the ring thereto.

The closure member 18g comprises a cup-shaped member 154 having an outwardly extending flange 155, formed adjacent the upper end thereof, and a downwardly depending flange 156. A disc 21g, of cork or other suitable heat insulating material, seats within the member 154 and has a snug fit therewith. A disc 121g, also formed of phenolic plastic material is disposed upon the upper surface of the cork disc 21g. This disc is similar in shape to the metal disc 121 (Figure 6), and for the same purpose, and it need not therefore be further described here. An annular ring 61g, also formed of phenolic plastic material, has threaded engagement with the member 154 and seats upon the disc 121g. This ring serves to secure the disc to the closure member.

The outer surface of the side wall of the closure member 18g, below the flange 155, is also of frusto-conical shape and is adapted to have a tight fit with the inner surface of the frusto-conical portion 152 of collar 12g. It will be noted that when the closure member is in place the flange 155 thereof seats upon a gasket 157, disposed between said flange and the supporting surface 150 of the collar, and the flange 156 of the closure member seats upon a gasket 158, which is disposed between said flange and the supporting surface 151 of the collar. These gaskets serve to assure a steam tight fit of the closure member 18g with the collar 12g. An annular ring 159, also formed of phenolic plastic material has threaded engagement with the inner side of the flange 153 and seats upon the gasket 157. This ring serves to retain the gasket 157 in its proper position when the closure member 18g is removed.

As will be understood by those skilled in the art, while I have shown several preferred embodiments of my invention, I do not wish to be limited thereto, since changes may be made therein without departing from the spirit and scope of the invention.

What I claim is:

1. In combination, in a device of the character described, an outer casing, a liner having side and bottom walls secured within the casing and thermally insulated therefrom, a plurality of tanks disposed in said liner, means disposed in said liner and out of contact with the side walls thereof for supporting and restraining lateral movement of said tanks within said liner, means entirely insulating said last named means and said tanks from the bottom wall of said liner, and means formed on the bottom wall of said liner and cooperating with said insulating means for restraining lateral movement of said supporting means with respect to said liner.

2. In combination, in a device of the character described, an outer casing, a liner having side and bottom walls secured within the casing and thermally insulated therefrom, a plurality of tanks disposed in said liner, means comprising a plate supporting said tanks within the liner, said plate being disposed in said liner and out of contact with the side walls thereof, means on said plate for retaining said tanks thereon, means entirely insulating said plate and said tanks from the bottom wall of said liner, and means formed on the bottom wall of said liner and cooperating with said insulating means for restraining lateral movement of said plate with respect to said liner.

3. In combination, in a device of the character described, an outer casing, a liner having a plurality of depressions formed in the bottom wall thereof disposed within the casing and thermally insulated therefrom, a plurality of tanks disposed within the liner, and means for supporting said tanks, said means seating in the depressions in said liner and having insulated point contact therewith.

4. In combination, in a device of the character described, an outer casing, a liner having a plurality of depressions formed in the bottom wall thereof disposed within the casing and thermally insulated therefrom, a plurality of tanks disposed within the liner, and means seating in the depressions in said liner and having insulated point contact therewith for supporting said tanks, said means comprising a plate having a plurality of teats formed thereon and a covering of insulation for said teats.

5. In combination, in a device of the character described, an outer casing, a liner having side and bottom walls secured within the casing and thermally insulated therefrom, a plurality of tanks disposed one on top of the other within said liner, certain of said tanks having a depending flange adapted to have a friction fit with the top of the tank upon which it is mounted, means disposed in said liner and out of contact with the side walls thereof for supporting and restraining lateral movement of said tanks within the liner, means for securing insulated point contact between said last named means and the bottom wall of said liner, and means formed on the bottom wall of said liner and coperating with said insulating means for restraining lateral movement of said supporting means with respect to said liner.

JAMES H. DEVINE.